United States Patent [19]

Burk et al.

[11] Patent Number: 4,779,431
[45] Date of Patent: Oct. 25, 1988

[54] DRIVE SYSTEM FOR AUTOMATIC WASHER

[75] Inventors: Jeffrey L. Burk, Lincoln Township, Berrien County; Michael J. Bottas, St. Joseph Township, Berrien County, both of Mich.

[73] Assignee: Whirlpool Corporation, Benton Harbor, Mich.

[21] Appl. No.: 2,674

[22] Filed: Jan. 12, 1987

[51] Int. Cl.$^4$ .................. D06F 17/08; D06F 33/02
[52] U.S. Cl. ................. 68/12 R; 68/133; 68/134
[58] Field of Search .......... 68/12 R, 23.7, 133, 68/134; 318/280, 281, 282, 286

[56] References Cited

U.S. PATENT DOCUMENTS

| | | | |
|---|---|---|---|
| 2,816,450 | 12/1957 | Conlee | 68/133 X |
| 3,216,226 | 9/1963 | Alger et al. | 68/23 R |
| 3,216,227 | 10/1963 | Alger et al. | 68/23.7 |
| 3,248,908 | 5/1963 | Pope | 68/12 R |
| 3,315,500 | 4/1967 | Brundage et al. | 68/23.7 X |
| 3,324,690 | 5/1965 | Button | 68/23.7 |
| 3,333,443 | 5/1965 | Chung et al. | 68/23 R |
| 3,355,914 | 11/1964 | Venema et al. | 68/23.7 |
| 3,369,381 | 9/1965 | Crane et al. | 68/12 R |
| 3,375,685 | 4/1968 | Scott | 68/12 R |
| 3,503,228 | 7/1963 | Lake | 68/12 R |
| 3,622,852 | 11/1971 | Myers | 318/328 |
| 3,688,170 | 8/1972 | Karklys et al. | 318/207 A |
| 3,914,963 | 10/1975 | Brimer | 68/23.7 |
| 4,184,347 | 1/1980 | Tobita et al. | 68/12 R |
| 4,222,250 | 9/1980 | Torita | 68/12 R |
| 4,232,536 | 11/1980 | Koseki et al. | 68/23.7 X |
| 4,335,592 | 6/1982 | Torita | 68/12 R |
| 4,372,134 | 2/1983 | Matsuo | 68/12 R |
| 4,542,633 | 9/1985 | Hirooka et al. | 68/133 X |
| 4,555,919 | 12/1985 | Brenner et al. | 68/134 |

FOREIGN PATENT DOCUMENTS

| | | | |
|---|---|---|---|
| 139284 | 7/1985 | Japan | 68/133 |
| 1164425 | 7/1986 | Japan | 68/12 R |
| 2137232 | 10/1984 | United Kingdom | 68/12 R |

Primary Examiner—Philip R. Coe
Attorney, Agent, or Firm—Hill, Van Santen, Steadman & Simpson

[57] ABSTRACT

A drive system for an automatic washer includes a high slip motor connected to a drive reduction mechanism for driving an energy absorbing agitator preferably having flexible vanes. The high slip motor is driven with spaced alternating pulses so that the agitator accelerates in one direction and then slows after the end of the pulse followed by acceleration and then slowing in a second direction so that sinusoidal agitation is produced by a pulse input to the motor.

23 Claims, 4 Drawing Sheets

DRIVE SYSTEM FOR AUTOMATIC WASHER

BACKGROUND OF THE INVENTION

1. Field of the Invention

The present invention relates to an agitator drive system for use in an automatic washer including an alternately reversing drive motor.

2. Description of the Prior Art

In U.S. Pat. No. 4,542,633, an agitating type washing machine is disclosed having an agitating wheel connected by a pulley arrangement to a reversible drive motor. The agitating wheel is shown as having short, thick blades. A rotational angle detector is connected to a control that causes the motor, which is described as having high rigidity, to rotate the agitating wheel about a predetermined angle. Upon reaching the predetermined angle, the motor is deenergized until the agitator wheel has stopped, at which time the motor is operated in a reverse direction to again rotate the agitator wheel about the predetermined angle.

An automatic washer manufactured by an assignee of U.S. Pat. No. 4,542,633, and appearing to incorporate the teachings of that patent, has been observed to have an agitator stroke angle of approximately 360° for each stroke at a rate of 70 strokes per minute. The high rigidity motor causes a nearly constant agitator speed in each rotational direction following a brief, rapid acceleration, and followed by the coasting to stop action.

Thus, automatic washer drive systems having reversing motors for producing a generally square wave agitation curve are known. An agitation curve is defined herein as the rotational speed of the agitator over time. A square wave agitation curve is, thus, a constant speed in one direction followed by a constant speed in the opposite rotational direction. Conversely, a sinusoidal agitation curve would result from a gradual acceleration followed immediately by a gradual deceleration of the agitator in each rotational direction.

In U.S. Pat. No. 3,315,500 to Brundage et al., a mechanism is provided as a drive system for an agitator using a motor operating at a constant speed in one direction to drive a hydraulic transmission which provides very rapid reversal of the agitator through a reversing valve and, thus, square wave type agitation motion. An elastic coupling is used between the agitator and the agitator drive shaft to reduce the shock which would otherwise be delivered to the agitator at each reversal. The patent teaches that square wave type agitation motion is preferred because more energy is imparted to the wash load.

An automatic washer having an axial air gap induction motor is disclosed in U.S. Pat. No. 4,232,536. The motor is repeatedly reversed to oscillate a vertical axis agitator through a planetary drive coupled therebetween, the motor being operated at high speeds. The desirability of providing a soft starting action of the agitator each time it reverses is recognized, the soft starting action being provided by the backlash associated with the planetary drive mechanism. No mention is made of the resultant agitator action.

U.S. Pat. No. 4,555,919 discloses a flexible vane agitator for use in a high stroke rate washer. The agitator exhibits a high degree of coupling to a wash load.

It has been found that sinusoidal agitator motion in a washing machine produces improved washing characteristics, with reduced fabric damage, and/or stretching of knits and other delicate items. However, such agitator motion has heretofore been available only by using a relatively large, complex and expensive reversing transmission between a unidirectional motor and an agitator.

SUMMARY OF THE INVENTION

In an automatic washing machine drive of the present invention, an abruptly starting and stopping drive signal is input to the drive mechanism to produce a substantially sinusoidal agitator motion for improved wash action at lower costs. This is accomplished by a tuned motor-drive-agitator system that includes, first, a high slip, low starting torque motor. The drive mechanism links the high slip motor to an agitator within the clothes basket of the automatic washer, and a control means supplies abruptly starting and stopping control pulses to the motor to drive the motor first in one direction and then in an opposite direction. The control pulses are in the shape of a modulated square wave.

The motor has a low starting torque to produce a soft start each time it is turned on by a control pulse. The control pulses are spaced apart to provide an off period for the motor that is long enough for the motor to slow but not to stop before the next control pulse starts the motor in an opposite direction. A reduction drive may be used to link the motor to an agitator, which in turn is "coupled" to a load. However, a reduction drive is not required in every embodiment. The agitator is an energy absorbing agitator having flexible vanes which couples its motion to the water and the wash load. The momentum of the rotating motor and the agitator that is coupled to the load provides a gradual slowing of the agitator speed each time the motor turns off.

When a first control pulse is received by a motor drive, a gradual start-up of the motor in one direction causes the agitator to begin turning in the first direction until a predetermined speed is reached, at which time the pulse ends and the motor is shut off, allowing the agitator to slow or "coast". Before, or just as, the agitator comes to a stop, the motor drive receives a second control pulse which causes the motor to thereafter begin driving the agitator in a reverse direction. The energy absorbing agitator, in combination with the high slip motor and the reduction drive, smooths the transition between direction reversals so that the modulated square wave control pulse input produces a nearly sinusoidal output at the agitator. Smoothing of the agitation curve to a nearly sinusoidal motion, as well as setting of the agitator stroke rate and angle, is produced by balancing, or matching, of the motor speed/torque characteristics with the pulse timing, motor-to-agitator reduction characteristics, and the agitator geometry as it interacts with the clothes load.

The present invention, thus, provides a low cost and efficient agitator drive which eliminates expensive and complex reversing transmissions, yet still produces the desired wash characteristics with optimum stroke rates and stroke angles.

DESCRIPTION OF THE PREFERRED EMBODIMENTS

Figure 1:
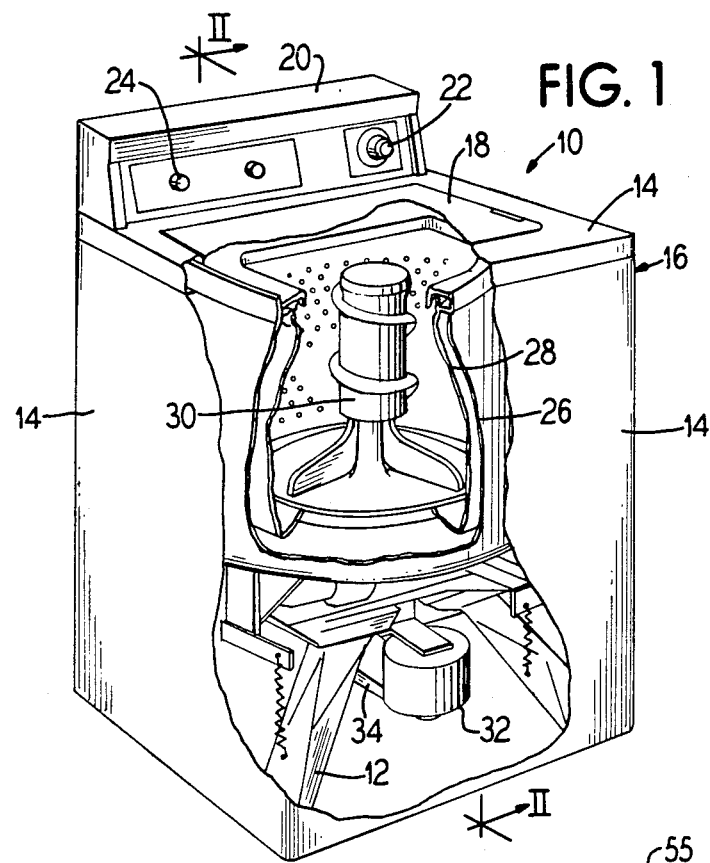
FIG. 1 is a perspective view of an automatic washing machine, partially broken away, and including a drive system according to the principles of the present invention.

In FIG. 1, reference numeral 10 indicates generally a vertical axis agitator type washing machine having presettable controls for automatically operating the machine through a programmed series of washing, rinsing, and spinning steps. The machine includes a frame 12, carrying panels 14 forming the sides, top, front, and back of a cabinet 16. A hinged lid 18 is provided in the usual manner for access to the interior of the washing machine 10. The washing machine 10 has a rear console 20 in which is disposed manually settable control means, including a timer dial 22 and a temperature selector 24.

Internally of the washing machine 10 there is disposed an imperforate fluid containing tub 26 within which is rotatably mounted a perforate basket 28 for rotation about a vertical axis. A vertically disposed agitator 30 is connected for operation to a motor 32 through a drive mechanism 34.

Figure 2:
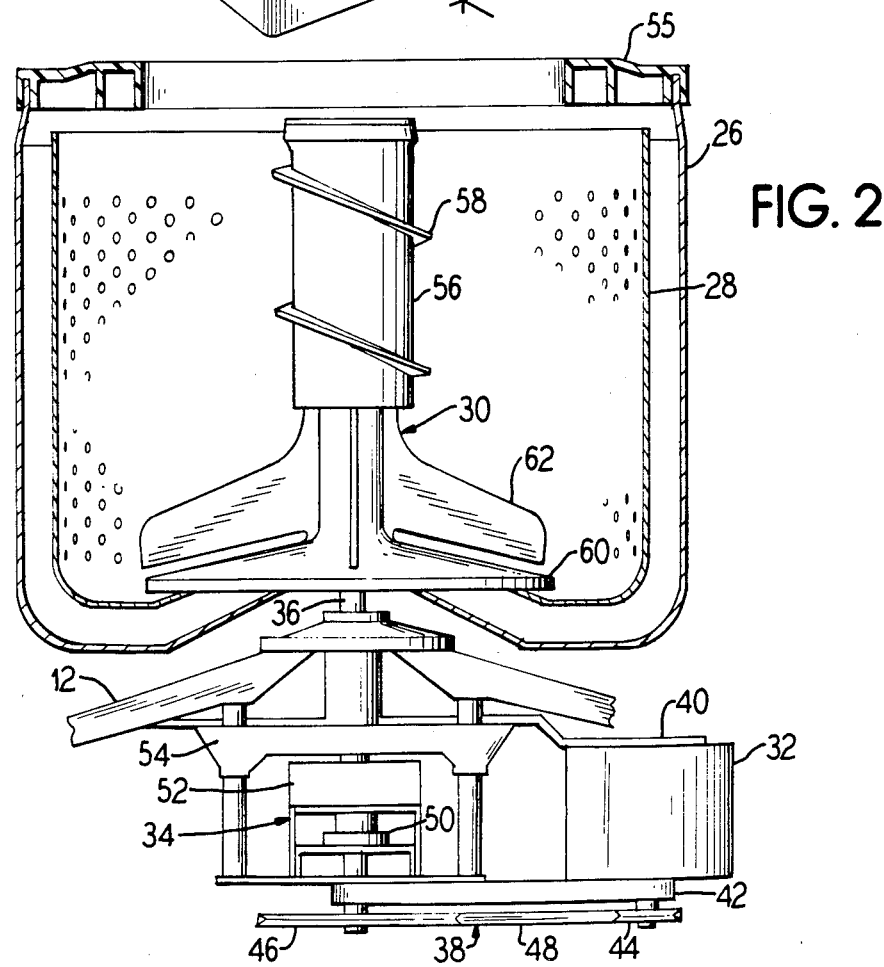
FIG. 2 is a cross section of the wash tub, agitator, and drive mechanism from the automatic washer of FIG. 1 taken along line II—II.

Referring to FIG. 2, the agitator 30 is linked by a shaft 36 to the reduction drive 34, which in turn is driven through a pulley arrangement 38 by the motor 32. The motor 32 is a high slippage motor and preferably a permanent split-capacitance (PSC) motor which has a low start torque relative to its breakdown torque to provide a soft start of the agitator. The PSC motor 32 also has a relatively flat load curve above the breakdown point so that steady state speed will not vary greatly with load. The motor 32 is mounted in a bracket arrangement 40 and 42 which connects to the frame 12 of the washer 10.

The motor 32 is linked by the pulley arrangement 38, including a drive pulley 44 and a driven pulley 46 connected by a belt 48, to the reduction drive 34. The reduction drive 34, in one embodiment, is a planetary gear drive which includes a spring clutch 50 and a planetary housing 52 mounted in a reduction drive frame 54 that connects to the frame 12. Although a planetary reduction drive is disclosed herein for use with the present invention, it is also contemplated that a variety of other reduction drive arrangements could be utilized as is known to those skilled in the art. It is also contemplated to eliminate the reduction drive and link the agitator directly to an appropriately selected motor.

The shaft 36 extends upwardly from the reduction drive 34 through the tub 26 and the perforate basket 28 and connects to the agitator 30. A tub ring 55 extends around the top of tub 26. The agitator 30 is a dual action agitator having an upper barrel 56 with helical vanes 58, as well as a lower agitator portion 60 from which extends a plurality of flexible vanes 62. The flexible vanes 62 enable the agitator 30 to absorb energy as the direction of rotation is reversed, while still coupling the agitator 30 to the load provided by water within the tub 26, as well as any articles of clothing therein. This coupling between the agitator and the clothes and water loads the motor to cause the speed to increase slowly. The flexible vanes provide a more uniform load coupling and torque over the angular range of the stroke over a range of clothes load sizes. The flexibility of the vanes 62 also prevents the impact loading at the beginning of the stroke from exceeding the locked rotor torque of the motor 32.

Figure 3:
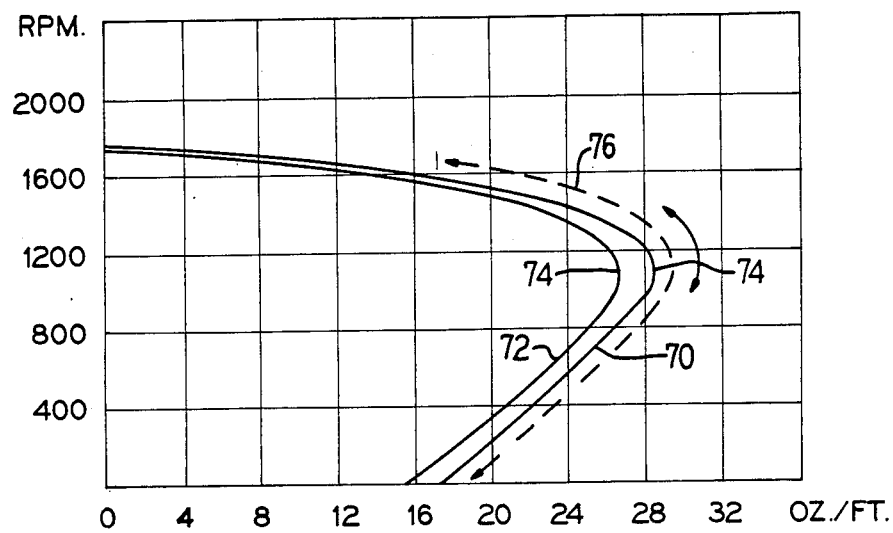
FIG. 3 is a graph of the torque/speed characteristic of a high slippage drive motor for use with the present drive mechanism.

The torque/speed characteristics of the PSC motor 32 are shown in FIG. 3. The torque/speed curve is plotted at 70 for a first direction of operation and the curve 72 shows the torque/speed characteristic in an opposite direction. As discussed above, the motor 32 has a low torque at slow speeds, and a relatively flat curve above a breakover or breakdown point 74 is indicated by the rightmost portion of the curve having the highest torque value. It can be seen that the PSC motor 32 is operating primarily on the start-up portion of the torque/speed curve.

Figure 4:
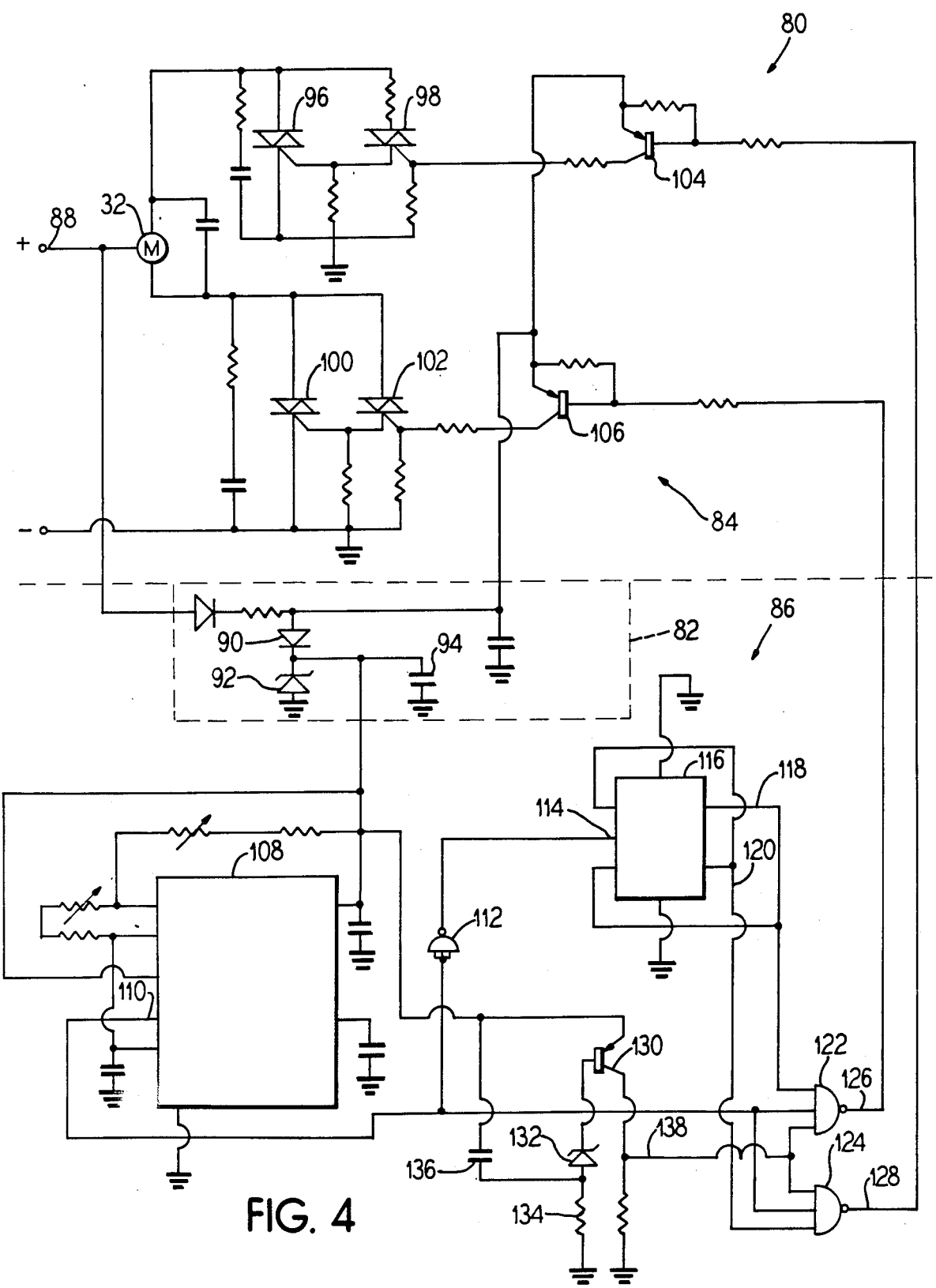
FIG. 4 is a circuit diagram of a control circuit for use with the drive mechanism of the present invention.

In FIG. 4, an electronic control circuit 80 for use with the present device is connected to drive the PSC reversable motor 32 during the wash cycle. The circuit 80 can be generally divided into three portions, a power supply 82, an output driver portion 84, and logic circuitry 86 as shown by the dotted separation lines. The power supply 82 is connected to AC power at the lead 88 and includes a half-wave rectifier 90, a zener diode regulator 92, and a capacitor 94 for filtering.

The output driver 84 includes two pairs of power triacs 96 and 98, and 100 and 102. The triac pairs 96, 98, 100, and 102 drive alternate fields of the motor 32. The triacs 96 and 98 are controlled by a transistor amplifier 104 for motor operation in a first direction, while the triacs 100 and 102 are controlled by a transistor amplifier 106 for operation of the motor 32 in an opposite direction. The base of each of the transistors 104 and 106 are connected for control by the logic circuitry 86.

The logic portion 86 of the control circuit 80 includes a timer 108 to control the amount of time that the motor 32 is on and the amount of time that it is off. An output 110 of the timer 108 supplies a trigger signal through an inverter 112 to a clock input 114 of a flip-flop 116 which is triggered at the rising edge of the inverted timer signal. The flip-flop 116 acts a switch to generate alternating signals from outputs 118 and 120 to two NAND logic gates 122 and 124. The timer signal from the output 110 is supplied in a non-inverted state to the NAND gates 122 and 124 as well so that the NAND gates 122 and 124 decode the output of the flip-flop 116 and the timer 108. The NAND gate 122 has an output 126 connected to the base of the transistor 106 in the driver circuit 84, while the NAND gate 124 has an output 128 connected to the transistor 104.

A transistor 130 and a zener diode 132, in conjunction with RC elements 134 and 136, generate an output on lead 138 after a predetermined period of time from initial power up and thereby provide a time delay to prevent the NAND gates 122 and 124 from supplying power to the driver circuitry 84 until the timer 108 has stabilized.

Figure 5:
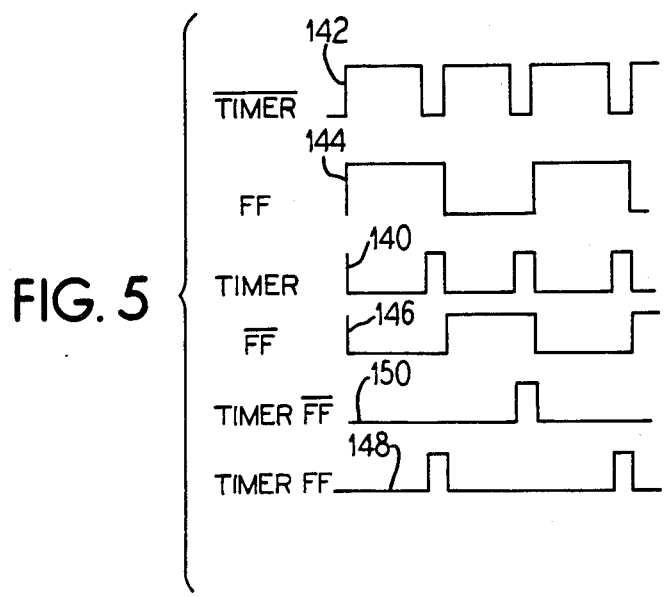
FIG. 5 is a signal pulse diagram for the circuit of FIG. 4.

Referring now to FIG. 5, a signal pulse diagram for the circuit of FIG. 4 shows a timer trigger signal 140 present on the timer output lead 110. The inverted timer signal 142 is produced by the inverter 122 and is connected at a clock input 114 of the flip-flop 116. The flip-flop output on lead 118, which is shown as signal 144, changes-state upon each positive-going transition of the inverted timer signal 142. The flip-flop 116 also produces a signal 146 on lead 120, which is the inverse of the signal 144. The NAND gate 122 receives both the timer signal 140 and the flip-flop signal 144 and produces therefrom a signal 148 for transmittal to the driver circuit 84. The NAND gate 124 receives both the timer signal 140 and the inverted flip-flop signal 146 and generates a signal 150 which is transmitted to the driver circuit 84. The signal 148 is a series of square wave pulses, while the square wave pulses of the signal 150 are spaced between the pulses 148. Thus, the output of the logic circuit 86 is a sequence of square wave pulses, preferably with a no-signal period between each, which alternately trigger inputs to opposite fields of the motor 32 to cause the modulated square wave pulses. There is no feedback present between the driver and logic circuits 84 and 86, thus, the invention uses open loop control.

Figure 6:
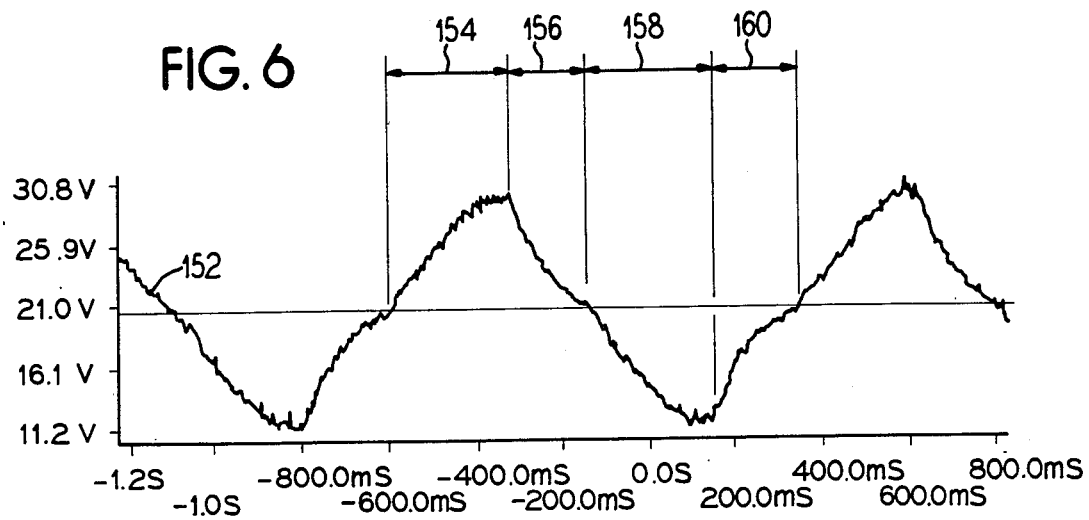
FIG. 6 is a time graph of the drive motor speed for one embodiment of a drive mechanism of the present invention.

FIG. 6 shows a motor speed plot 152 for the motor 32 as it operates according to the principles of the present invention. The motor 32 has a somewhat sinusoidal output curve. Each complete cycle of the motor speed graph of FIG. 6 occurs in 0.96 seconds, which results in 63 strokes per minute for the agitator 30. Each cycle can be broken into four divisions, a first of which is indicated at 154, occupying 0.3 seconds and indicating motor start-up from zero velocity. At 0.3 seconds into the cycle the second step, indicated at 156, begins as power is disconnected from the motor 32. The second step 156 lasts for 0.18 seconds and shows a gradual slowing down or coasting of the motor to near zero velocity. In step 158, the motor 32 begins accelerating in an opposite direction for 0.3 seconds. After the predetermined time, power is again disconnected from the motor 32 during step 160 and the motor 32 coasts toward zero velocity for 0.18 seconds. At this time, the cycle begins again so that a generally sinusoidal continuous output is generated by on and off pulsing of the motor with alternating square wave signals.

Figure 7:
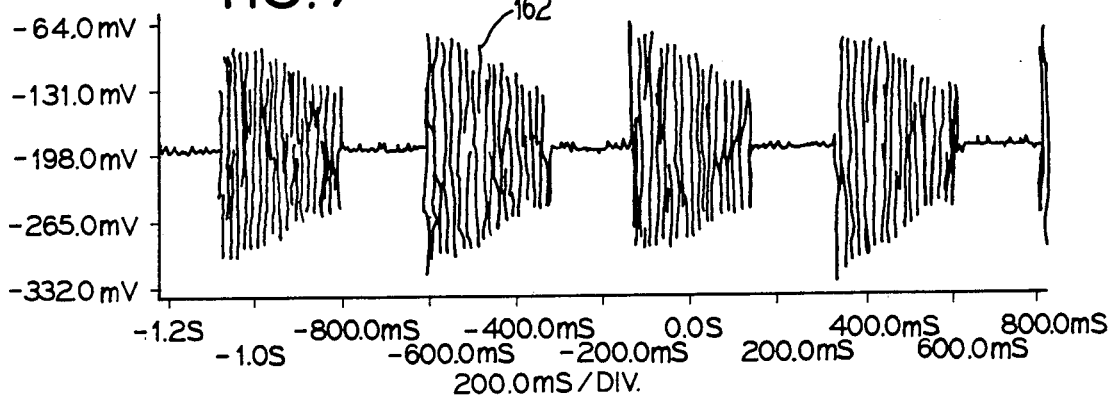
FIG. 7 is a time graph of motor current corresponding to the motor speed graph of FIG. 6.

In FIG. 7, current flow plot 162 from the power lead 88 and through the motor 32 is shown for comparison with the motor speed plot 152 of FIG. 6. As can be seen, a square wave modulated by 60 Hz.AC power is supplied to the motor 32 during both the positively and negatively directed accelerations, each to a different winding. AC power is discontinued between each direction reversal to enable the motor to slow down prior to starting in the opposite direction. The positive acceleration is a result of AC power received by the motor 32 during the pulses 148, while the negative accelerations result from the pulses 150 causing an application of AC power to the motor 32.

The modulated square wave shown at 162 has a duration and spacing corresponding to the drive characteristics of the motor, reduction means, and agitator so that a stroke angle of between 120° and 230° results. In the preferred embodiment, the stroke angle is between 190° and 200° and between 60 and 70 strokes per minute. An agitator stroke, as defined herein, is rotational movement of the agitator in one direction, and then reverse rotation back to the starting position. Stroke angle is the angular movement in one direction only.

Figure 8:
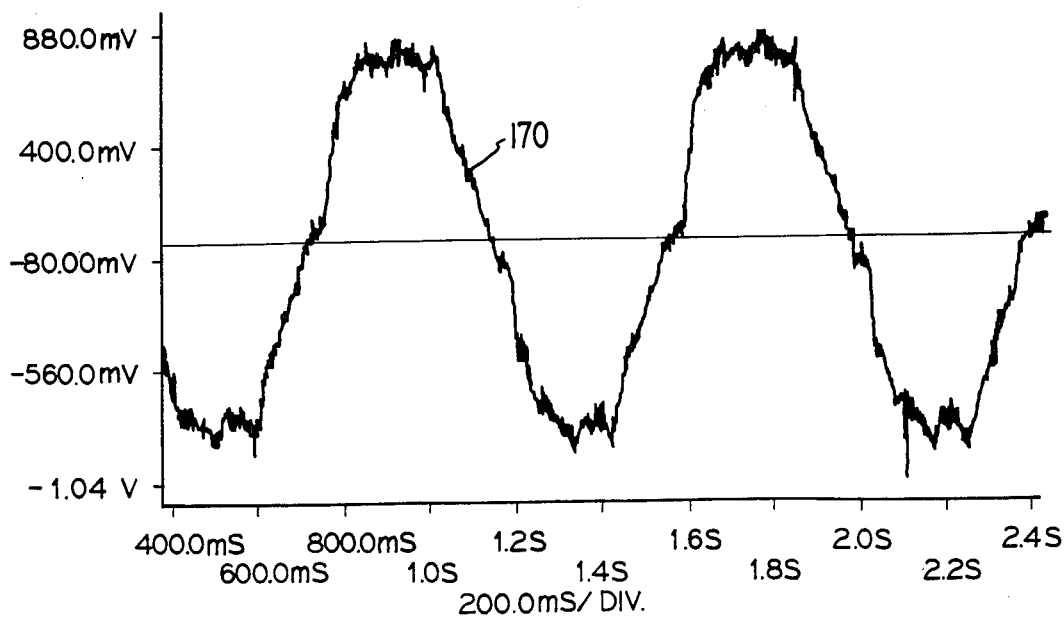
FIG. 8 is a time graph of the agitator speed resulting from the motor speed and current of FIGS. 6 and 7.

Referring now to FIG. 8, the agitator velocity for the present invention is shown by a curve 170. As can be seen by comparing the graphs of FIGS. 6 and 8, the characteristics of the drive mechanism 34 and the flexible vane agitator 30 further smooth the agitator motion to produce a more nearly sinusoidal output from the square wave input.

Although the present invention is disclosed as including a PSC motor, it is also contemplated to utilize other types of motors whose operation can be reversed, such as by reversing the polarity of the applied voltage.

Thus, there has been shown and described, an agitator drive system for a washer 10 wherein a simple drive reduction mechanism 34 links a high slip motor 32 to an energy absorbing agitator 30, the motor 32 being driven through a drive supplied with square pulses, such as modulated square wave pulses, so that a sinusoidal agitator motion results. Thus, a complex transmission for converting unidirectional motion of a motor to a sinusoidal agitation is no longer required. Efficiency is increased, wear on parts is decreased, and a high level of washing action is still obtained from the present device.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of my contribution to the art.

The embodiments of the invention in which an exclusive property or privilege is claimed are defined as follows:

1. A drive system for an automatic washer having an agitator mounted within a wash tub, comprising:
   a high slip motor mounted within the automatic washer;
   a drive linking said high slip motor to rotate the agitator; and
   a control circuit connected to operate said high slip motor in first and second opposite directions, said control circuit including means for alternating motor operation in said first and second directions, said alternating means interrupting the operation of said motor between each direction reversal so that the agitator undergoes a substantially sinusoidal rotational motion during operation of said motor.

2. An automatic washer for laundering fabric articles in a water bath, comprising:
   a washer cabinet;
   a wash tub mounted in said washer cabinet for receiving the articles to be laundered in the water bath;
   an energy absorbing agitator rotatably mounted within said wash tub, said energy absorbing agitator being couplable to the water bath and the articles to be laundered;
   a low starting torque motor mounted in said washer cabinet;
   a reduction drive having a high speed input end connected for rotation by said motor and a low speed output end connected for rotating said agitator; and
   control means for reversely operating said motor at a periodic rate to cause said motor to operate predominantly at low torque starting speeds.

3. An automatic washer as claimed in claim 2, wherein said low starting torque motor is a permanent split capacitance motor.

4. An automatic washer as claimed in claim 2, wherein said energy absorbing agitator includes flexible vanes.

5. An automatic washer as claimed in claim 2, wherein said motor is deenergized for a predetermined time before said control means reverses operation of said motor.

6. An automatic washer as claimed in claim 2, wherein the stroke rate of said agitator being driven by said motor is between 60 and 70 strokes per minute.

7. An automatic washer as claimed in claim 2, wherein the stroke angle of said agitator when driven by said motor is between 120° and 230°.

8. An automatic washer is claimed in claim 7, wherein the stroke angle is between 190° and 200°.

9. An automatic washer as claimed in claim 7, wherein said control means includes a drive circuit connected to drive said motor, said control means generating a series of substantially square wave pulses for operating said drive circuit.

10. An automatic washer as claimed in claim 2, wherein said control means is an open loop control.

11. An automatic washer as claimed in claim 2, wherein said control means is a control circuit including:
   a driver circuit having first and second triacs connected to drive alternate fields of said motor;
   a logic circuit having a timer and means for producing a series of spaced pulses on first and second outputs, said first output connected to said first triac and said second output connected to said second triac; and
   a power supply connected to supply power to said logic circuit.

12. An automatic washer as claimed in claim 2, wherein said reduction drive includes a planetary gear arrangement.

13. A vertical axis automatic washer for laundering fabric articles in a water bath, comprising:
   a cabinet including an openable door;
   a wash tub and concentrically mounted basket within said cabinet for receiving the water bath and the articles to be laundered;
   a vaned agitator rotatably mounted within said tub and basket and engaging the water bath;
   a reduction drive having a high speed input end connected to rotatably drive said agitator, said reduction drive including a high speed output end;
   a high slip motor connected to drive said high speed input end of said reduction drive, said motor having first and second fields for operation in first and second opposite directions;
   a control circuit connected to operate said high slip motor in two opposite directions, said control circuit including:
      a first active element connected to said first field of said motor;
      a second active element connected to said second field of said motor;
      a timer having an output carrying a series of timer pulses;
      logic circuitry connected to said timer output and having first and second logic outputs carrying first and second trigger pulses,
      said first logic output connected to said first active element so that said first trigger pulses cause said first active element to activate said first field of said motor for operation in said first direction, and
      said second logic output connected to said second active element so that said second trigger pulses cause said second active element to activate said second field of said motor for operation in said second direction.

14. An automatic washer as claimed in claim 13, wherein said logic circuitry includes:
   a flip-flop having an input connected to receive said timer output, said flip-flop having an inverting output and a non-inverting output;
   a first logic gate having a first input connected to said timer output and a second input connected to said non-inverting output of said flip-flop, said first logic gate having an output being said first logic output; and
   a second logic gate having a first input connected to said timer output and a second input connected to said inverting output of said flip-flop, said second logic gate having an output being said second logic output.

15. An automatic washer as claimed in claim 14, wherein said logic circuitry includes time delay means connected to said first and second logic gates for interrupting said first and second trigger pulses for a predetermined time when power is initially applied to said logic circuitry, and means for applying power to said logic circuitry.

16. A drive system according to claim 1, wherein said means for alternating motor operation comprises a driver circuit to drive alternate fields of said motor.

17. A drive system according to claim 16, wherein said means for alternating motor operation further comprises a logic circuit having a timer means for producing a series of spaced pulses in first and second outputs connected to said driver circuit.

18. A drive system according to claim 17, wherein said driver circuit comprises two pairs of power triacs, each pair driving an alternate field of the motor, said triac pairs being respectively controlled by first and second transistor amplifiers.

19. A drive system according to claim 18, wherein said logic circuit further comprises a flip-flop which receives an inverted signal from said timer, said flip-flop operating as a switch to generate alternating signals to first and second NAND logic gates, said timer signal being supplied to said NAND gates in non-inverted form to decode the output of said flip-flop and said timer, said first and second NAND gates having outputs respectively connected to said first and second transistor amplifiers.

20. A drive system according to claim 1, wherein said control circuit includes:
   a drive circuit having first and second triacs connected to drive alternate fields of said motor;
   a logic circuit having a timer and means for producing a series of spaced pulses on first and second outputs, said first output connected to said first triac and said second output connected to said second triac; and
   a power supply connected to supply power to said logic circuit.

21. A drive system according to claim 2, wherein said control means for reversely operating said motor comprises a driver circuit to drive alternate fields of said motor.

22. A drive system accirding to claim 21, wherein said control means for reversely operating said motor further comprises a logic circuit having a timer and means for producing a series of spaced pulses on first and second outputs connected to said driver circuit.

23. A drive system according to claim 13, wherein said first and second active elements comprise forst and second triacs respectively connected to said first and second fields.

* * * * *